United States Patent
Mazzara, Jr.

(10) Patent No.: US 6,915,126 B2
(45) Date of Patent: Jul. 5, 2005

(54) METHOD OF ACTIVATING A WIRELESS COMMUNICATION SYSTEM IN A MOBILE VEHICLE

(75) Inventor: William E. Mazzara, Jr., Drayton Plains, MI (US)

(73) Assignee: General Motors Corporation, Detroit, MI (US)

( * ) Notice: Subject to any disclaimer, the term of this patent is extended or adjusted under 35 U.S.C. 154(b) by 561 days.

(21) Appl. No.: 10/141,468

(22) Filed: May 8, 2002

(65) Prior Publication Data

US 2003/0211854 A1 Nov. 13, 2003

(51) Int. Cl.$^7$ .......................... H04Q 7/20; H04M 3/00
(52) U.S. Cl. ............... 455/411; 455/569.2; 455/435.1; 455/11.1; 342/69; 713/168
(58) Field of Search .................. 455/411, 435.1, 455/414.1, 418, 569.1, 569.2, 11.1; 342/69, 70, 357.1; 340/426.1; 713/171, 168

(56) References Cited

U.S. PATENT DOCUMENTS

| | | | | |
|---|---|---|---|---|
| 5,524,135 A | * | 6/1996 | Mizikovsky et al. | 455/411 |
| 6,338,140 B1 | * | 1/2002 | Owens et al. | 713/171 |
| 6,611,913 B1 | * | 8/2003 | Carroll et al. | 713/171 |
| 6,643,504 B1 | * | 11/2003 | Chow et al. | 455/411 |
| 6,728,612 B1 | * | 4/2004 | Carver et al. | 701/33 |
| 2001/0044296 A1 | * | 11/2001 | Mizikovsky | 455/411 |
| 2002/0094808 A1 | * | 7/2002 | Tiedemann et al. | 455/419 |
| 2003/0162533 A1 | * | 8/2003 | Moles et al. | 455/419 |
| 2004/0009772 A1 | * | 1/2004 | Mazzara | 455/436 |
| 2004/0142659 A1 | * | 7/2004 | Oesterling | 455/11.1 |
| 2004/0203340 A1 | * | 10/2004 | Oesterling | 455/9 |
| 2004/0203692 A1 | * | 10/2004 | Schwinke et al. | 455/435.1 |

* cited by examiner

Primary Examiner—David Hudspeth
Assistant Examiner—Kamran Afshar
(74) Attorney, Agent, or Firm—Anthony Luke Simon

(57) ABSTRACT

The invention provides a method for activating an in-vehicle wireless communication system. A vehicle identification number associated with a vehicle may be received. An electronic serial number of a network access device located in the vehicle may be determined based on the vehicle identification number. Identification information of a user of the vehicle may be received. The electronic serial number and the user identification information may be sent to a selected wireless carrier to obtain a mobile phone number.

27 Claims, 3 Drawing Sheets

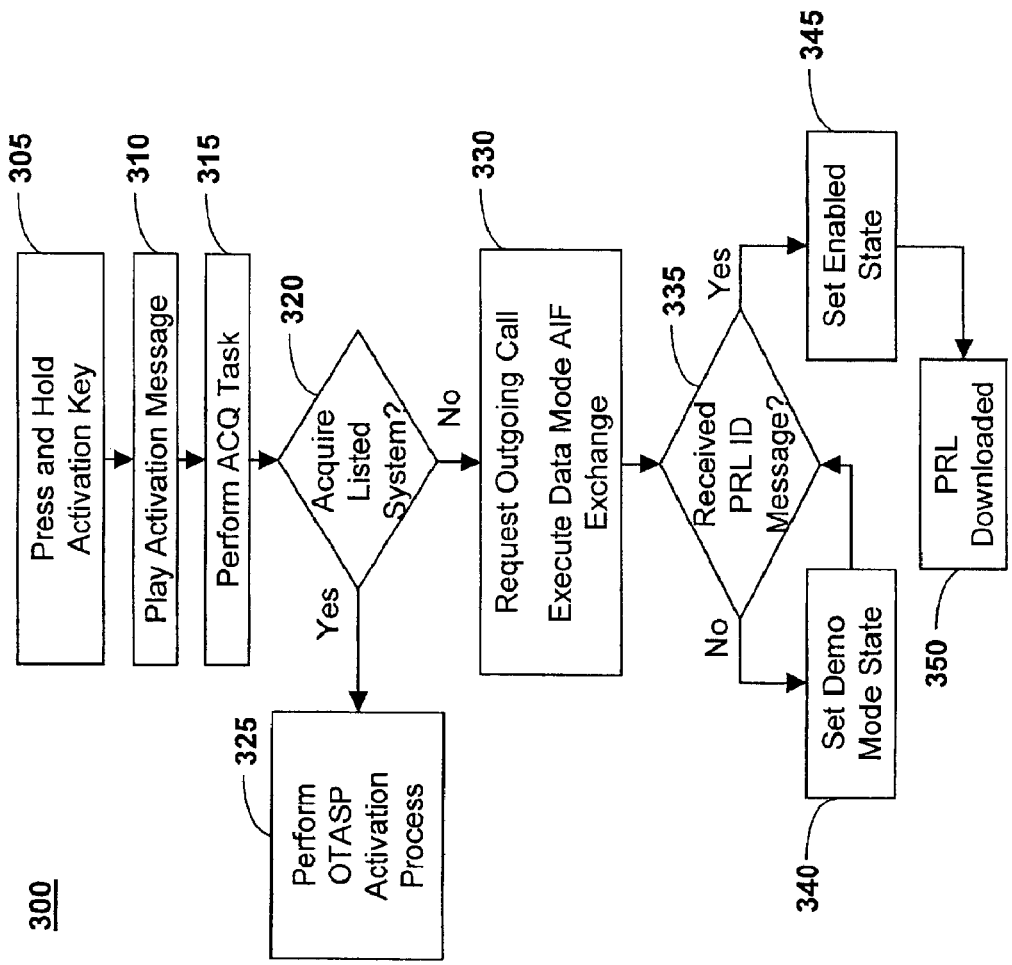

METHOD OF ACTIVATING A WIRELESS COMMUNICATION SYSTEM IN A MOBILE VEHICLE

FIELD OF THE INVENTION

This invention generally relates to a method of operating a wireless communication system. In particular, the invention relates to a method of activating a wireless communication system in a mobile vehicle.

BACKGROUND OF THE INVENTION

One of the fastest growing areas of communications technology is related to automobile network solutions. An increasing number of mobile vehicles are being equipped with wireless communication devices, requiring vehicle manufacturers and dealers to have an efficient way for preparing a wireless communication device in an automobile before delivery to a new owner.

Because of the complexities in setting up network communications and instrument settings for an in-vehicle wireless communication unit, the business and information delivery methods among the vehicle and network device manufacturers, wireless carriers, communication services call centers and vehicle dealers may benefit from well-defined, coordinated procedures. The manufacturers of the wireless communication unit and the vehicle may load default information into the software of the communication unit. When a vehicle dealer receives a new vehicle, the dealer may need to initialize the communications unit in preparation for delivery to the new owner. The process of initializing the unit should be largely automated, straightforward and require little time.

When the new owner receives the mobile vehicle with an installed vehicle communications unit, the enrollment process for obtaining communication services from a call center should be efficient and uncomplicated. In addition, the user interface of the communication device should be easy to initiate and to use.

The processes of initiating and enrolling a vehicle communications unit need to be adaptable enough to make proper connections and set up services in alternative ways when preferred ways are unavailable. One preferred process utilizes over-the-air service provisioning (OTASP) specified in TIA/EIA/IS-683-A (1998), "Over-the-Air Service Provisioning of Mobile Stations in Spread Spectrum Systems."

It is the object of this invention, therefore, to provide a method of activating an in-vehicle wireless communication system in an effective, efficient, user-friendly, and adaptable way, addressing the needs described above.

SUMMARY OF THE INVENTION

One aspect of the invention provides a method of activating an in-vehicle wireless communication system. A vehicle identification number associated with a vehicle may be received. An electronic serial number of a network access device (NAD) located in the vehicle may be determined based on the vehicle identification number. Identification information of a user of the vehicle may be received. The electronic serial number and the user identification information may be sent to a selected wireless carrier to obtain a mobile phone number.

The mobile phone number may be loaded into a vehicle communications unit containing the network access device. The mobile phone number may be loaded into the vehicle communications unit from the selected wireless carrier using an over-the-air service provisioning operation. The mobile phone number may be loaded into the vehicle communications unit from a call center using an air interface function. The mobile phone number may be loaded into the vehicle communications unit using an in-vehicle voice recognition system.

A user alert signal may be provided in response to a system status. The user alert signal may be a flashing light emitting diode, a progression tone, or a system message.

An activation key signal may be received to initiate an activation algorithm. At least one initial parameter may be set in a vehicle communications unit. The initial parameter may be an electronic serial number, a station identification number, an authentication code, an enrollment cleared number, an emergency cleared number, an analog cleared number, a preferred roaming list, a call setting, a factory setting, a feature setting, a flag setting, a progression tone, a setting, a light emitting diode setting, a discontinuous-receive setting, a button feature state, an air-bag notification state, or a system setting.

At least one system parameter may be downloaded to a vehicle communications unit. The system parameter may be a preferred roaming list (PRL) update, a mobile phone number, a call setting, a feature setting, or a system setting. One or more subscriber parameters may be activated in response to the downloaded system parameter.

Another aspect of the current invention is an in-vehicle wireless communication system. The in-vehicle wireless communication system may provide means for receiving a vehicle identification number associated with a vehicle, means for determining an electronic serial number of a network access device located in the vehicle based on the vehicle identification number, means for receiving identification information of a user of the vehicle, and means for sending the electronic serial number and the user identification information to a selected wireless carrier to obtain a mobile phone number.

The in-vehicle wireless communication system may include means for loading the mobile phone number into a vehicle communications unit containing the network access device. The in-vehicle wireless communication system may include means for providing a user alert signal in response to a system status.

The in-vehicle wireless communication system may include means for receiving an activation key signal to initiate an activation algorithm. The in-vehicle wireless communication system may include means for activating at least one initial parameter in a vehicle communications unit. The in-vehicle wireless communication system may include means for downloading at least one system parameter to a vehicle communications unit. The system may include means for setting one or more subscriber parameters in response to the downloaded system parameter.

Another aspect of the current invention is a computer usable medium, including a program for operating an in-vehicle wireless communication system. The program may include computer program code to receive a vehicle identification number associated with a vehicle; to determine an electronic serial number of a network access device located in the vehicle based on the vehicle identification number; to receive identification information of a user of the vehicle; and to send the electronic serial number and the user identification information to a selected wireless carrier to obtain a mobile phone number.

The computer program may include code to load the mobile phone number into a vehicle communications unit containing the network access device. The computer program may include code to provide a user alert signal in response to a system status. The computer program may include code to receive an activation key signal to initiate an activation algorithm. The computer program may include code to set at least one initial parameter in a vehicle communications unit. The computer program may include code to download at least one system parameter to a vehicle communications unit. The computer program may include code to activate one or more subscriber parameters in response to the downloaded system parameter.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 3 is a flow diagram of another embodiment of a method for activating a wireless communication system in a mobile vehicle, in accordance with the current invention.

DETAILED DESCRIPTION OF THE PRESENTLY PREFERRED EMBODIMENTS

Figure 1:
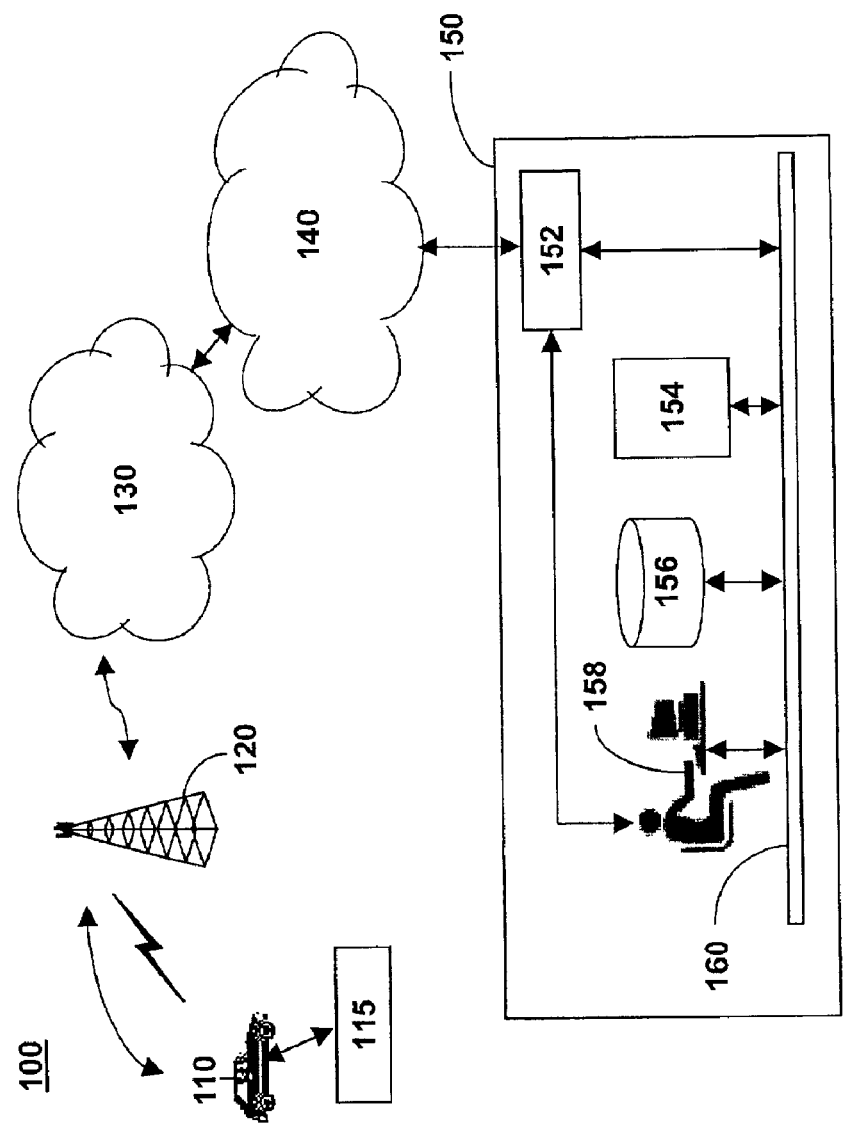
FIG. 1 is a schematic diagram of one embodiment of a system for activating a wireless communication system in a mobile vehicle, in accordance with the current invention.

FIG. 1 shows one embodiment of a system for activating a wireless communication system in a mobile vehicle, in accordance with the present invention at 100.

Mobile vehicle access system 100 may contain one or more mobile vehicles 110, one or more wireless carrier systems 120, one or more communication network 130, one or more land networks 140, and one or more call centers 150. Call center 150 may contain one or more voice and data switches 152, one or more communication services managers 154, one or more communication services databases 156, one or more communication services advisors 158, and one or more bus systems 160.

Mobile vehicle 110 may be a mobile vehicle equipped with suitable hardware and software for transmitting and receiving voice and data communications. Mobile vehicle 110 may contain vehicle communications unit 115 for sending or receiving voice or data communications. Vehicle communications unit 115 may include, for example, a digital signal processor, a wireless modem, a global positioning system (GPS) unit, an in-vehicle memory, and a network access device (NAD). The network access device may be an analog, digital, or dual mode cellular phone. Vehicle communications unit 115 may be a vehicle communications processor.

Mobile vehicle 110 may send and receive radio transmissions from wireless carrier system 120. Wireless carrier system 120 may be any suitable system for transmitting a signal from mobile vehicle 110 to communication network 130.

Communication network 130 may comprise services from one or more mobile telephone switching offices and wireless networks. Communication network 130 connects wireless carrier system 120 to land network 140. Communication network 130 may be any suitable system or collection of systems for connecting wireless carrier system 120 to mobile vehicle 110 and land network 140.

Land network 140 may be a public-switched telephone network Land network 140 may be an Internet protocol (IP) network. Land network 140 may be comprised of a wired network, an optical network, a fiber network, another wireless network, or any combination thereof. Land network 140 may connect communication network 130 to call center 150. Communication network 130 and land network 140 may connect wireless carrier system 120 to a communication node or call center 150.

Call center 150 may be a location where many calls may be received and serviced at the same time, or where many calls may be sent at the same time. The call center may be a telematics call center, prescribing communications to and from vehicle communications unit 115 in mobile vehicle 110. The call center may be a voice call center, providing verbal communications between an advisor in the call center and a subscriber in a mobile vehicle. The call center may contain each of these functions.

Call center 150 may contain one or more voice and data switches 152. Switch 152 may be connected to land network 140. Switch 152 may transmit voice or data transmissions from call center 150. Switch 152 also may receive voice or data transmissions from vehicle communications unit 115 in mobile vehicle 110 through wireless carrier system 120 and communication network 130 and land network 140. Switch 152 may receive from or send to one or more communication services managers 154 data transmissions via one or more bus systems 160. Communication services manager 154 may be any suitable hardware and software capable of providing requested communication services to vehicle communications unit 115 in mobile vehicle 110. Communication services manager 154 may send to or receive from one or more communication services databases 156 data transmissions via bus system 160. Communication services manager 154 may send to or receive from one or more communication services advisors 158 data transmissions via bus system 160. Communication services database 156 may send to or receive from communication services advisor 158 data transmissions via bus system 160. Communication services advisor 158 may receive from or send to switch 152 voice or data transmissions.

Communication services manager 154 may provide one or more of a variety of services, including enrollment services, navigation assistance, directory assistance, roadside assistance, business or residential assistance, information services assistance, emergency assistance, and communications assistance. Communication services manager 154 may transmit data to vehicle communications unit 115 in mobile vehicle 110 through wireless carrier system 120, communication network 130, land network 140, voice and data switch 152, and bus system 160. Communication services manager 154 may store or retrieve data and information from communication services database 156. Communication services manager 154 may provide requested information to communication services advisor 158.

Communication services advisor 158 may be a real advisor or a virtual advisor. A real advisor may be a human being in verbal communication with a user or subscriber in mobile vehicle 110 via vehicle communications unit 115. A virtual advisor may be a synthesized voice interface responding to requests from vehicle communications unit 115 in mobile vehicle 110. Communication services advisor 158 may provide services to vehicle communications unit 115 in mobile vehicle 110. Services provided by communication services advisor 158 may include enrollment services, navigation assistance, directory assistance, roadside assistance, business or residential assistance, information services assistance, emergency assistance, and communications assistance. Communication services advisor 158 may communicate with vehicle communications unit 115 in mobile vehicle 110 through wireless carrier systems 120, communication network 130, and land network 140 using voice transmissions, or through communication services manager 154 and switch 152 using data transmissions. Switch 152 may select between voice transmissions and data transmissions.

Vehicle communications unit 115 in mobile vehicle 110 may initiate, for example, a communication services request to call center 150 via wireless carrier system 120, communication network 130, and land network 140. Vehicle communications unit 115 in mobile vehicle 110 may initiate, for example, communications with wireless carrier system 120 in the same geographical region as the mobile vehicle.

Figure 2:
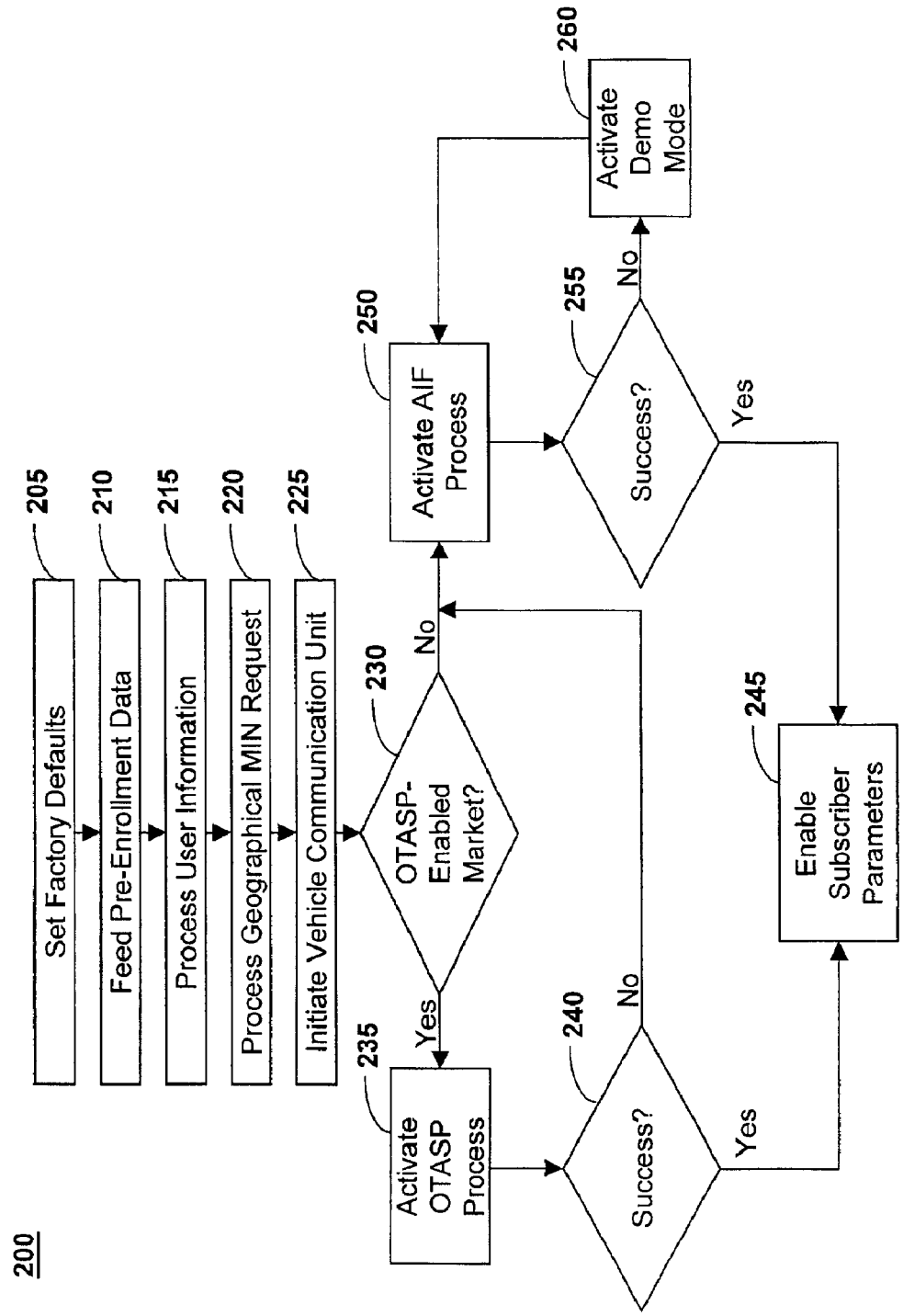
FIG. 2 is a flow diagram of one embodiment of a method for activating a wireless communication system in a mobile vehicle, in accordance with the current invention.

FIG. 2 shows a flow diagram of one embodiment of a method for activating a wireless communication system in a mobile vehicle, in accordance with the present invention at 200.

The vehicle communications unit of a new mobile vehicle may have software defaults set and certain features enabled in its network access device before a new user may be enrolled for services from a vehicle communications service provider, as seen at block 205. The manufacturer or vendor may record and send to an appropriate call center station the vehicle identification number (VIN), the station identification number (STID) of the vehicle communication processor or unit, the electronic serial number (ESN) of network access device (NAD), and an authentication key for the vendor, which all may be used to identify the vehicle and vehicle communications unit during the enrollment process with the wireless service provider.

The manufacturer or vendor may load, for example, a dialable phone number or mobile directory number (MDN) into the network access device. The manufacturer or vendor may load, for example, a generic default mobile station identifier (MSID), which may be a non-portable and non-dialable 10-digit mobile phone identification number (MIN) or 15-digit international mobile station identifier (IMSI) that is used within land network 140. The manufacturer or vendor may load a default number comprising a partial MDN/MIN. The manufacturer or vendor also may load, for example, an authentication key, and a clear, non-validating phone number.

The manufacturer or vendor may load, for example, an enrollment hotline phone number into an international dialing table, which may contain the enrollment number, an emergency number and other phone numbers of up to fifteen digits. The manufacturer or vendor may load into a particular vehicle communication device, for example, an enrollment preferred roaming list (PRL) containing records of system identifiers (SIDs) for all available markets enabled by OTASP. The manufacturer or vendor may set, for example, all records in the PRL to non-preferred and an acquisition-type preference of the enrollment PRL to factory-default first channel preference. The manufacturer or vendor may load, for example, a default OTASP initiation feature code and an automatic initiation system selection code that are provided by a selected wireless carrier system.

The manufacturer or vendor may set initial parameters to a predefined state. The manufacturer or vendor may disable, for example, outgoing call capability. The manufacturer or vendor may set to a predefined state, for example, the number of registration attempts, a cellular registration control, a virtual advisor setting, a unit-add function, an airbag/collision sensor function, a voice recognition system, a discontinuous receive (DRx) time-cycled wake-up function, an emergency call key, a vendor call key, a calling center call function, a call retry strategy function, a light emitting diode state, a calling function payment mode, an analog operation timer, and a virtual advisor button.

A vehicle equipped with a vehicle communication unit may be delivered for sale, for example, to a dealer. The dealer may determine the vehicle identification number of the vehicle. The dealer may gather personal information from the new user of the vehicle equipped with a new vehicle communication unit. The dealer then may send the vehicle identification number and personal information to the proper call center based on geographical location, as seen at block 210. The personal information may include, for example, a preferred address of the customer. Optionally, the user or subscriber may give a suitable cellular phone number when the user provides the local phone number and account with an appropriate wireless carrier. The user identification information, for example, may be sent by a telephone call to the call center. The user identification information, for example, may be uploaded from a computer at the dealership to the call center.

The call center may acknowledge the receipt of the vehicle identification number and user identification information. As seen at block 215, the call center may process the enrollment information. The call center may determine the station identification and electronic serial number of the network access device by cross-referencing the vehicle identification number of the vehicle. The information for setting up a connection between the vehicle communication unit and call center then may be sent to a selected wireless carrier. The wireless carrier may process the geographical MIN/MDN request, as seen at block 220.

The dealer may begin the activation process for initializing the vehicle communication unit by pressing and holding an activation key, as seen at block 225. The activation key, for example, may be a button on the control panel of a vehicle communication unit located on an instrument console of a vehicle. The activation key may send a signal to initiate an activation algorithm.

One or more initial parameters may be set in the vehicle communications unit. The initial parameters may include an electronic serial number, a station identification number, an authentication code, an enrollment cleared number, an emergency cleared number, an analog cleared number, a preferred roaming list, a call setting, a factory setting, a feature setting, a flag setting, a progression tone, a light-emitting-diode setting, a discontinuous-receive setting, a button feature state, an air-bag notification state, and a system setting.

The activation may include, for example, the receipt of a MIN/MDN or phone number from a wireless carrier that services the local geographical area of the user. The vehicle communication unit may be activated, for example, by pressing a single key on a control panel of a vehicle communications unit. If the activation process fails, the vehicle communication unit may give a failure message. The vendor may call the call center directly from the vehicle communications unit. The call may be initiated, for example, by activating a key on the vehicle communication unit that is dedicated to calling the call center. The call may be initiated, for example, by a voice-recognition function. If the activation from the vehicle fails, the vendor may call for technical assistance from the call center. The call center may process the activation and provisioning of the vehicle communication units in the best possible manner.

The new user of a vehicle communication unit may activate the vehicle communication unit. The activation process may begin, for example, by pressing an activation key for ten seconds. The activation process may begin, for example, by giving a voice command.

During the beginning of the activation process, the vehicle communication unit may give a visual or aural alert signal. The vehicle communication unit, for example, may play an activation jingle and progression of tones. The unit, for example, may flash a red or green light emitting diode, depending on the functional state of the unit. The unit, for example, may play a system message.

The vehicle communication unit may begin the PRL enrollment process with the selected wireless carrier. The wireless carrier may process a geographical MIN/MDN request and send back an updated MIN/MDN. The local wireless carrier may or may not be OTASP-enabled, as seen at block 230. As seen at block 235, if the vehicle communication unit is able to acquire a system in its PRL enrollment list via an over-the-air service provisioning operation, or if the vehicle may be driven to an OTASP-enabled market, then the vehicle communication unit may be activated by the OTASP process, as specified in TIA/EIA/IS-683-A (1998), "Over-the-Air Service Provisioning of Mobile Stations in Spread Spectrum Systems."

The OTASP process may or may not be successful in completing the update of the PRL, as seen at block 240. When the activation process is successfully completed, one or more system parameters of the user or subscriber may be enabled, activated, loaded, or set, as seen at block 245. The system, user, or subscriber parameters may include a preferred roaming list update, a mobile phone number, a call setting, a feature setting, or a system setting. One or more of the system, user, or subscriber parameters may be automatically updated after a system parameter is downloaded. The vehicle communication unit may give a visual or aural disposition signal or message to convey success or failure in the loading of a phone number or enabling of subscriber parameters. The user alert signal may be, for example, a flashing light emitting diode, a progression tone, or a system message.

When the local wireless carrier is not OTASP-enabled, the vehicle communication may initiate a call via an air interface function (AIF) to the call center to request a phone number, as seen at block 250.

The AIF enrollment process with the call center may or may not be successful, as seen at block 255. When successful, the call center may send a phone number and receive an acknowledged response from the vehicle communication unit. An outdated PRL flag may be set in the vehicle communication unit so that the wireless carrier may update the PRL later when the unit and wireless carrier are connected. When the AIF process succeeds, one or more subscriber parameters may be enabled, activated, loaded, or set, as seen at block 245. The vehicle communication unit may give visual or aural disposition signal or message to convey success or failure in the loading of a phone number or enabling subscriber parameters.

If the AIF process fails, the vehicle communication unit may be placed in a demonstration mode, as seen at block 260. The vehicle communication unit may try to activate the AIF process at a later time, as seen at block 250.

A failure message, for example, may instruct the user to press a key to reach the call center directly. Alternatively, the user may call into the call center, for example, via another mobile phone unit to receive the new phone number. The user may then install the new phone number via a voice-recognition routine.

The vehicle communication unit may remain powered on and active until the process is completed, for example, when a power mode change occurs during the activation process. The activation process may continue to completion, for example, when other non-emergency requests are initiated during the process. The other requests may be queued.

The activation process may be initiated again and the outdated PRL flag may be reset, for example, when the connection with the wireless carrier or call center is lost during an activation attempt. The vehicle communication unit may return to the factory default state, for example, when all activation requests to the wireless carrier and call center fail. The vehicle communication unit may then be activated at a later time.

FIG. 3 shows a flow diagram of another embodiment of a method for activating a wireless communication system in a mobile vehicle, in accordance with the present invention at 300. The activation of vehicle communications unit 115 in mobile vehicle 110 may begin by pressing and holding an activation key to generate an activation key signal, as seen at block 305. The vehicle communications unit 115 may play an activation message while attempting to contact wireless carrier system 120. Wireless carrier system 120 may process a geographical MIN/MDN request. The vehicle communication unit 115 may begin the PRL enrollment process with the selected wireless carrier. Vehicle communications unit 115 may perform one or more acquisition tasks, as seen at block 315. The acquisition tasks may or may not be successful in establishing contact with a wireless carrier in the preferred roaming list, as seen at block 320. When the acquisition task is successful, vehicle communications unit 115 may perform the OTASP activation process, as seen at block 325. One or more system parameters may be downloaded to vehicle communications unit 115.

When unsuccessful, vehicle communications unit 115 may originate a direct call to call center 150 using an air-interface function, as seen at block 330. Once a connection is established, call center 150 may execute an exchange of data between vehicle communications unit 115 and call center 150. Vehicle communications unit 115 may or may not receive a PRL identification list message, as seen at block 335. If the message is not received, communication services may be set to the demonstration mode, as seen at block 340. Vehicle communications unit 115 may wait and attempt again to receive the message, as seen in 335. When the PRL identification message is received, the vehicle communications unit may be set to an enabled state, as seen at block 345, and the PRL may be downloaded, as seen at block 350.

What is claimed is:

1. A method of activating an in-vehicle wireless communication system, comprising:

receiving a vehicle identification number associated with a vehicle;

determining an electronic serial number of a network access device located in the vehicle based on the vehicle identification number;

receiving identification information of a user of the vehicle; and sending the electronic serial number and the user identification information to a selected wireless carrier to obtain a mobile phone number.

2. The method of claim 1 further comprising:
loading the mobile phone number into a vehicle communications unit containing the network access device.

3. The method of claim 2 wherein the mobile phone number is loaded into the vehicle communications unit from the selected wireless carrier using an over-the-air service provisioning operation.

4. The method of claim 2 wherein the mobile phone number is loaded into the vehicle communications unit from a call center using an air interface function.

5. The method of claim 2 wherein the mobile phone number is loaded into the vehicle communications unit using an in-vehicle voice recognition system.

6. The method of claim 1 further comprising:
providing a user alert signal in response to a system status.

7. The method of claim 6 wherein the user alert signal is selected from a group consisting of a flashing light emitting diode, a progression tone, and a system message.

8. The method of claim 1 further comprising:
receiving an activation key signal to initiate an activation algorithm.

9. The method of claim 1 further comprising:
setting at least one initial parameter in a vehicle communications unit.

10. The method of claim 9 wherein the initial parameter is selected from a group consisting of an electronic serial number, a station identification number, an authentication code, an enrollment cleared number, an emergency cleared number, an analog cleared number, a preferred roaming list, a call setting, a factory setting, a feature setting, a flag setting, a progression tone, a light emitting diode setting, a discontinuous receive setting, a button feature state, an air bag notification state, and a system setting.

11. The method of claim 1 further comprising:
downloading at least one system parameter to a vehicle communications unit.

12. The method of claim 11 wherein the system parameter is selected from a group consisting of a preferred roaming list update, a mobile phone number, a call setting, a feature setting, and a system setting.

13. The method of claim 11 further comprising:
activating at least one subscriber parameter in response to the downloaded system parameter.

14. An in-vehicle wireless communication system comprising:
means for receiving a vehicle identification number associated with a vehicle;
means for determining an electronic serial number of a network access device located in the vehicle based on the vehicle identification number;
means for receiving identification information of a user of the vehicle; and
means for sending the electronic serial number and the user identification information to a selected wireless carrier to obtain a mobile phone number.

15. The system of claim 14 further comprising:
means for loading the mobile phone number into a vehicle communications unit containing the network access device.

16. The system of claim 14 further comprising:
means for providing a user alert signal in response to a system status.

17. The system of claim 14 further comprising:
means for receiving an activation key signal to initiate an activation algorithm.

18. The system of claim 14 further comprising:
means for setting at least one initial parameter in a vehicle communications unit.

19. The system of claim 14 further comprising:
means for downloading at least one system parameter to a vehicle communications unit.

20. The system of claim 19 further comprising:
means for activating at least one subscriber parameter in response to the downloaded system parameter.

21. A computer usable medium including a program for operating an in-vehicle wireless communication system comprising:
computer program code to receive a vehicle identification number associated with a vehicle;
computer program code to determine an electronic serial number of a network access device located in the vehicle based on the vehicle identification number;
computer program code to receive identification information of a user of the vehicle; and
computer program code to send the electronic serial number and the user identification information to a selected wireless carrier to obtain a mobile phone number.

22. The computer usable medium of claim 21 further comprising:
computer program code to load the mobile phone number into a vehicle communications unit containing the network access device.

23. The computer usable medium of claim 21 further comprising:
computer program code to provide a user alert signal in response to a system status.

24. The computer usable medium of claim 21 further comprising:
computer program code to receive an activation key signal to initiate an activation algorithm.

25. The computer usable medium of claim 21 further comprising:
computer program code to set at least one initial parameter in a vehicle communications unit.

26. The computer usable medium of claim 21 further comprising:
computer program code to download at least one system parameter to a vehicle communications unit.

27. The computer usable medium of claim 26 further comprising:
computer program code to activate at least one subscriber parameter in response to the downloaded system parameter.

* * * * *